Applicant:
Louis Breguet
By Mauro + Lewis
Attorneys

April 5, 1932.  L. BRÉGUET  1,852,230
LANDING GEAR
Filed Feb. 25, 1931  2 Sheets-Sheet 2

Applicant:
Louis Bréguet
By Mauro & Lewis
Attorneys

Patented Apr. 5, 1932

1,852,230

UNITED STATES PATENT OFFICE

LOUIS BREGUET, OF PARIS, FRANCE, ASSIGNOR TO SOCIETE ANONYME DES ATELIERS D'AVIATION LOUIS BREGUET, OF PARIS, FRANCE, A COMPANY OF FRANCE

LANDING GEAR

Application filed February 25, 1931, Serial No. 518,275, and in France March 22, 1930.

In landing gears with two lateral wheels as are now fitted on most airplanes, the wheels, which are used for running as well for the take off as for the landing, are located in front of the center of gravity of the airplane, but at a distance therefrom that cannot be too great as it would otherwise result in diminishing the ease with which the airplane can take its line of flight for taking off. Consequently, the danger of overturning is still considerable, chiefly when running after landing, in particular when the brakes are applied to the wheels, if the braking device does not work properly or is not correctly operated.

Furthermore this standard type of landing gear is open to various other criticisms, among which the following ought to be more particularly mentioned:

Puncturing of a tire creates grave danger of the airplane overturning either in the longitudinal or in the transversal direction, when running on bad ground or at a high speed.

The size of the wheels and tires grows with the weight of the airplane and increases the above mentioned danger.

The tie rods and struts of the airplane cannot be secured to the landing gear at the level of the hub of the wheel without making the taking to pieces and reassembling of the wheels and tires somewhat difficult.

The tandem wheeled landing gear, which is the object of my invention, obviates these various drawbacks and further makes it possible to obtain various other results that will appear from the following description with reference to the appended drawings, given merely by way of example and in which.

Figure 1:
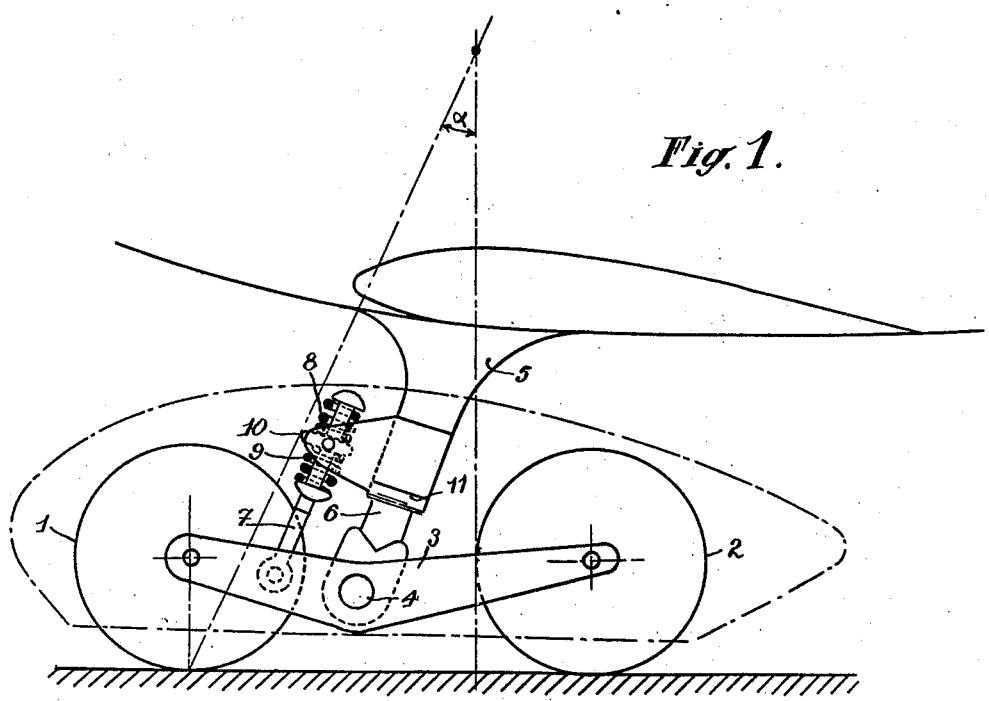
Fig. 1 is a diagrammatic view of a landing gear according to my invention.

Adverting to Fig. 1, the landing gear comprises, in its simplest type, two lateral sets of tandem wheels. Each set of wheels comprises two wheels 1 and 2, of any suitable type, and which may, for example, be exactly similar to each other. Said wheels are connected to each other through an equalizing bar 3, pivotally mounted on axle 4 which is parallel to the wheel axles. Said axle is connected to the airplane through a frame provided with an elastic suspension. In the case of Fig. 1 this frame consists of a tube 5 secured to the structure of the airplane, and in which can slide, with the interposition of a shock absorber, such as a hydro-pneumatic brake, a rod 6 which carries the axle 4 of the equalizing bar 3 of the wheels. This rod is guided, for instance by means of lugs, engaging a fixed groove provided in frame 5, so that the longitudinal plane of symmetry of the tandem wheels may always stay perfectly parallel to the plane of symmetry of the airplane. As above stated, tube 5 is fixed to the structure of the plane so as to absorb the vertical, longitudinal and transversal stresses to which the wheels are subjected.

On the other hand, the rotation of the equalizing bar 3 about axle 4 is submitted to the action of an elastic and shock absorbing device adapted to work in both directions, so as to give the system a certain degree of freedom about axle 4, which, in turn, is elastically suspended to the airplane structure, as above explained.

The elastic braking of the rotation of equalizing bar 3 can be of any kind and obtained through any known device such as: hydro-pneumatic brakes, combination of "sandows" (elastic cables) or of springs. Said elastic braking system may comprise two of these known devices, acting in opposite directions of rotation of the equalizing bar respectively, or consist of only one of these devices, capable of acting in two opposite directions. Thus, in the case of Fig. 1 the equalizing bar 3 is elastically articulated about its axle 4 through a fork 7 whose upper rod can move relatively to a support 10, which is fixed to frame 5, the motion of said rod being braked in both directions by means of two springs 8, 9 interposed between support 10 and two collars respectively provided on fork 7.

Figure 2:
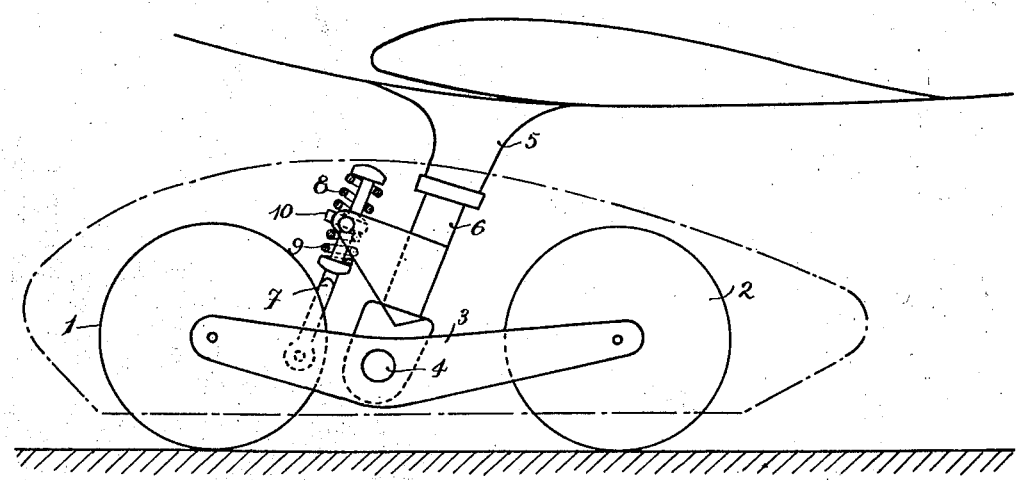
Fig. 2 is a diagrammatic view of a different embodiment.

In the case of Fig. 2, which shows a different embodiment of the landing gear according to my invention, the elastic means for connecting equalizing bar 3 to its axle 4 do not rest directly on a support secured to fixed frame 5, as in the preceding embodiment, but are secured to a movable rod 6, fixed to the axle 4 of the equalizing bar 3.

My invention is further characterized by the fact that the amount of rotation of the equalizing bar 3 about its axle 4, which rotation is elastically braked, as it has just been described, is limited in both directions by suitable stops or equivalent means (for instance the flattening of springs 8 and 9 of Fig. 1).

The stop that serves to limit rotation of the nose of the airplane in the downward direction is so adjusted as to be brought into play when the plane threatens to overturn, and when the distance of the propeller from the ground reaches a certain predetermined minimum. If the airplane still keeps its nose down, the rear wheel will be lifted up from the ground.

The opposite stop, which serves to limit the rotation of the nose of the airplane in the upward direction can be so adjusted as to be brought into play before the tail of the plane touches the ground.

Furthermore the axles of the wheels of the same tandem set are placed respectively in front and back of the center of gravity of the airplane, whatever be the length of the portion of the equalizing bar axle supporting rod 6 that is forced into frame 5, and whatever be the position of said equalizing bar with respect to the stops that limit, as above explained, the relative inclination of said bar. The axle of the front wheel is placed as far in front as possible, and that of the rear wheel as little back as possible, of the center of gravity.

Under these conditions, when the airplane lands, with its nose tilting up, the rear wheels are the first to come into contact with the ground. Owing to the elastic suspension of the equalizing bar with respect to the frame, as well as to the elastic angular connection between said equalizing bar and its axle 4, the front wheels are brought into contact with the ground, and the airplane can be kept, while it is running on the ground, either with its nose up, or in line of normal flight if the couple that tends to place it in the latter position and which results from the position of the center of gravity between the axles of the two tandem wheels, is not acted against. If the landing gear is provided with wheel brakes, a particular feature of my invention consists in applying the brakes only to the rear wheel of each tandem set. If the airplane tends to overturn in consequence of too strong a braking, the rear wheels are lifted through the above described action of the corresponding stops, and the danger resulting from the braking is thus automatically done away with, whatever the conditions under which the brakes work or are operated may be.

Moreover, when the plane runs along the ground, it is easy to have it take its line of flight (tail up) as the above described suspension is of course adjusted to correspond to said position of the airplane body relatively to the landing gear. At the time of the take off, the nose of the airplane is slightly tilted up, and, in any case, less than while landing, and the airplane rests on the rear wheels, which carry but a small part of the weight of the airplane, while the front wheels are lifted up from the ground without any risk of the tail coming into contact with the ground, owing to the adjustment of the stop serving to limit the corresponding rotation of the equalizing bar 3.

My invention also has the following advantages:

The possibility of increasing at will the angle, called safety angle, shown in $\alpha$, Fig. 1, between a vertical line passing through the center of gravity and a line passing through said center of gravity and the point of contact of the front wheel of the landing gear with the ground, without diminishing the ease with which the airplane can take its line of flight, when taking off.

The lessening of the risk of overturning, firstly because of the preceding advantage, and secondly, owing to the fact that, when brakes are made use of, only the rear wheel of each tandem set is braked.

The possibility of reducing the usual tail skid to play the part of a safety member or shock absorber, only intervening, to protect the tail from coming into contact with the ground, in the case of the airplane being tilted up to an excessive degree when being landed.

The possibility of using, with airplanes of equal weight, wheels and tires of lesser size, the number of supporting wheels being doubled due to the tandem arrangement which is a characteristic feature of my invention.

The lessening, which results from the preceding feature, of the gravity of the danger of a tire getting punctured, as the tandem arrangement keeps one wheel and one tire in good condition.

The possibility of choosing a relatively low point of the frame, such as the base 11 of the fixed tube 5 for securing thereto the struts, tie rods, and the like without diminishing in the least the accessibility and the ease with which all the organs of a tandem set can be assembled, kept in good condition and repaired.

The embodiments of my invention that have been shown in Figs. 1 and 2 have been described merely by way of example, and it goes without saying that, as above stated, any known elastic connecting and braking devices could be used, as well for the suspension of the axle 4 of equalizing bar 3 to the airplane body as for the means for elastically limiting the rotation of said bar about its axle.

Figure 4:
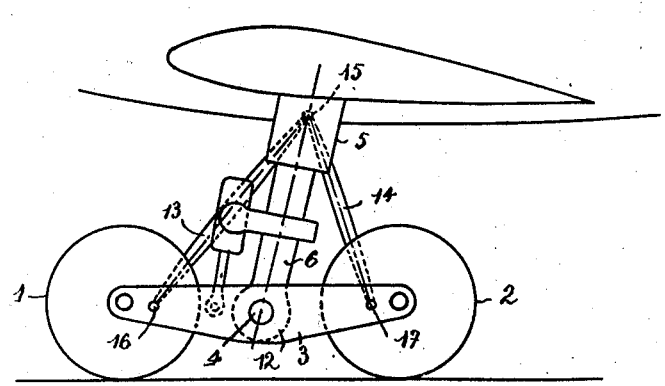
Figs. 3 and 4 are a front and an elevational view respectively of still another embodiment of the landing gear according to my invention.
Figure 3:
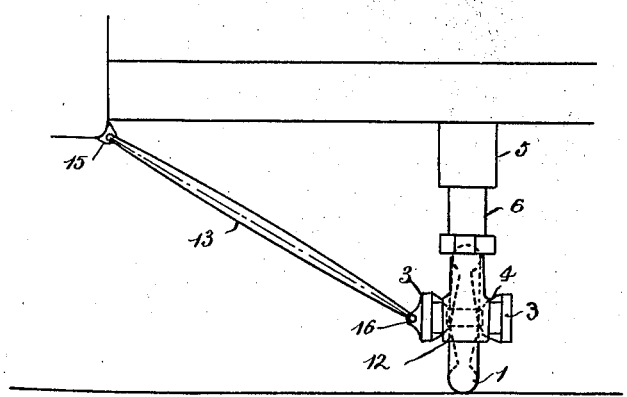

In the embodiment of my invention shown in front view and in elevational view respectively in Figs. 3 and 4, the element 5 that supports the sliding tube 6 terminated by a sleeve 12 surrounding the axle 4 of equalizing rod 3, is not adapted to withstand the lateral stresses to which the wheels in contact with the ground are submitted, neither is it submitted to the corresponding couple. Said stresses and said couple are absorbed by two tie rods 13 and 14, articulated, through ball and socket joints, at both ends, on the one hand to the fuselage or the wing in 15 and on the other hand to the forward and rearward ends respectively of the equalizing bar. Said tie rods thus form a V the apex of which is at 15 and the ends 16 and 17 on the equalizing bar at points as far apart as possible for instance located in the vicinity of the wheel axles. In this embodiment, the axle 4 of equalizing bar 3 is given a certain lateral play with respect to socket 12 so as to compensate for transversal displacements of the wheels sets resulting from the elasticity of the suspension. In the movements of a wheel set with respect to the airplane, slightly different transversal displacements are imparted to the wheels, but this has no real importance as it is well known in the case of the ordinary arrangements of landing gears having but one wheel on each side and a crank axle.

Tandem sets of wheels according to my invention could be disposed side by side in any suitable number so as to support through wheels of any given type, a considerable weight, corresponding to the number of sets of wheels that is used.

The whole of one set of wheels or of several sets disposed in parallel could be inclosed within a stream line nacelle, as shown in dotted lines, by way of example, in Figs. 1 and 2.

Finally my invention could also be applied to an oscillating float, the vertical suspension and the oscillation of which would be elastically limited. It will suffice, in that case, to substitute for the two wheels of a tandem set, a float secured to the equalizing bar that is the main feature of my invention, suitable apertures being provided for allowing displacement of the float with respect to fixed frame 5. In that case, a particular feature of my invention will consist in providing the under side of the float with two projections located substantially where would be located the points of contact with the ground of the wheels of a corresponding tandem set.

Likewise, a float of that kind could be combined either with a suitable set of wheels located in a suitable axial cavity provided in the float, or with two parallel sets of wheels disposed on either side of said float.

While I have disclosed what I deem to be the preferred form of my device, it is to be understood that I do not wish to be limited thereto as there might be changes made in the arrangement, disposition and form of the pieces without departing from the principle of my invention as comprehended within the scope of the appended claims.

What I claim is:

1. A landing gear for airplanes comprising in combination, a frame rigidly secured to the airplane structure, a member elastically connected to said frame and adapted to slide with respect to it, a transversal axle carried by said member, a longitudinal equalizing bar pivotally mounted on said axle, elastic means for braking the movement of rotation of said bar about its axle, means for limiting said movement in both directions, and a landing member carried by said bar adapted to come in contact with the surface on which the airplane is to land.

2. A landing gear for airplanes comprising in combination a frame rigidly secured to the airplane structure, a member adapted to slide elastically with respect to said frame, a transversal axle carried by said member, a longitudinal equalizing bar pivotally mounted on said axle, elastic means for braking in both directions the movement of rotation of said bar with respect to its axle, means for limiting said movement in both directions, and two wheels mounted one at each end of said equalizing bar.

3. A landing gear for airplanes comprising in combination a tube rigidly secured to the airplane structure, a rod adapted to slide elastically within said tube, a transversal axle carried by said rod, a longitudinal equalizing bar pivotally mounted on said axle, elastic means for braking in both directions the movement of rotation of said bar with respect to its axle, means for limiting the movement in both directions, and two wheels mounted one at each end of said equalizing bar.

4. A landing gear for airplanes comprising in combination a tube rigidly secured to the airplane structure, a rod adapted to slide elastically within said tube, a transversal axle carried by said rod, a longitudinal equalizing bar pivotally mounted on said axle, elastic means interposed between said tube and said bar for braking in both directions the movement of rotation of said bar with respect to its axle, means for limiting said movement in both directions, and two wheels mounted one at each end of said equalizing bar.

5. A landing gear for airplanes comprising in combination a tube rigidly secured to the airplane structure, a supporting rod adapted to slide elastically within said tube, a transversal axle carried by said rod, a longitudinal equalizing bar pivotally mounted on said axle, an arm projecting from said tube, a rod fixed to said equalizing bar at a certain distance from its axle and adapted to slide in said arm, two springs disposed on said last mentioned rod, one on either side of said arm, two collars on the last mentioned rod, one on each side of said arm adapted to support the ends of said spring respectively, and two wheels mounted one at each end of said equalizing bar.

6. A landing gear for airplanes comprising in combination a tube rigidly secured to the airplane structure, a supporting rod adapted to slide elastically within said tube, a transversal axle carried by said rod, a longitudinal equalizing bar pivotally mounted on said axle, two wheels mounted one at each end of said equalizing bar, an arm projecting from said tube, a fork secured to said equalizing bar at a point intermediate between the center of the front wheel and said axle, a rod integral with said fork and adapted to slide in the last mentioned arm, two collars on said rod, one on each side of said arm adapted to limit the sliding motion of said rod, and two springs on the last mentioned rod, one on each side of said arm, bearing at one end on said arm and at the other end on said collars respectively.

7. A landing gear for airplanes comprising in combination a tube rigidly secured to the structure of the airplane, a rod adapted to slide elastically within said tube, a transversal axle carried by said rod, a longitudinal equalizing bar pivotally mounted on said axle, elastic means interposed between said rod and said bar for braking in both directions the movement of rotation of said bar with respect to its axle, means for limiting its motion in both directions, and two wheels mounted one at each end of said equalizing bar.

8. A landing gear for airplanes comprising in combination a tube rigidly secured to the airplane structure, a supporting rod adapted to slide elastically within said tube, a transversal axle carried by said rod, a longitudinal equalizing bar pivotally mounted on said axle, two wheels mounted one at each end of said equalizing bar, an arm projecting from said supporting rod, a fork secured to said equalizing bar at a point located between the center of the front wheel and said axle, a rod integral with said fork and said fork being adapted to slide in said arm, two collars on the last mentioned rod one on each side of said arm adapted to limit the sliding motion of said rod, and two springs on the last mentioned rod one on each side of said arm each bearing at one end on said arm and at the other end on one of said collars.

9. A landing gear for airplanes comprising in combination, a tube rigidly secured to the airplane structure, a rod adapted to slide vertically within said tube, a transversal axle carried by said rod, a longitudinal equalizing bar pivotally mounted on said axle, two wheels mounted one at each end of said equalizing bar, elastic means for braking in both directions the movement of rotation of said bar with respect to its axle, means for limiting said movement in both directions, two tie rods articulated at one end both to the same point of the airplane structure and at the other ends to the opposite ends of the equalizing bar respectively, for supporting the transversal loads that are undergone by the landing gear.

In testimony whereof I have signed this specification.

LOUIS BREGUET.